T. J. WILSON.
CUTTER BAR FOR HARVESTING MACHINES.
APPLICATION FILED APR. 22, 1915.
1,164,691. Patented Dec. 21, 1915.
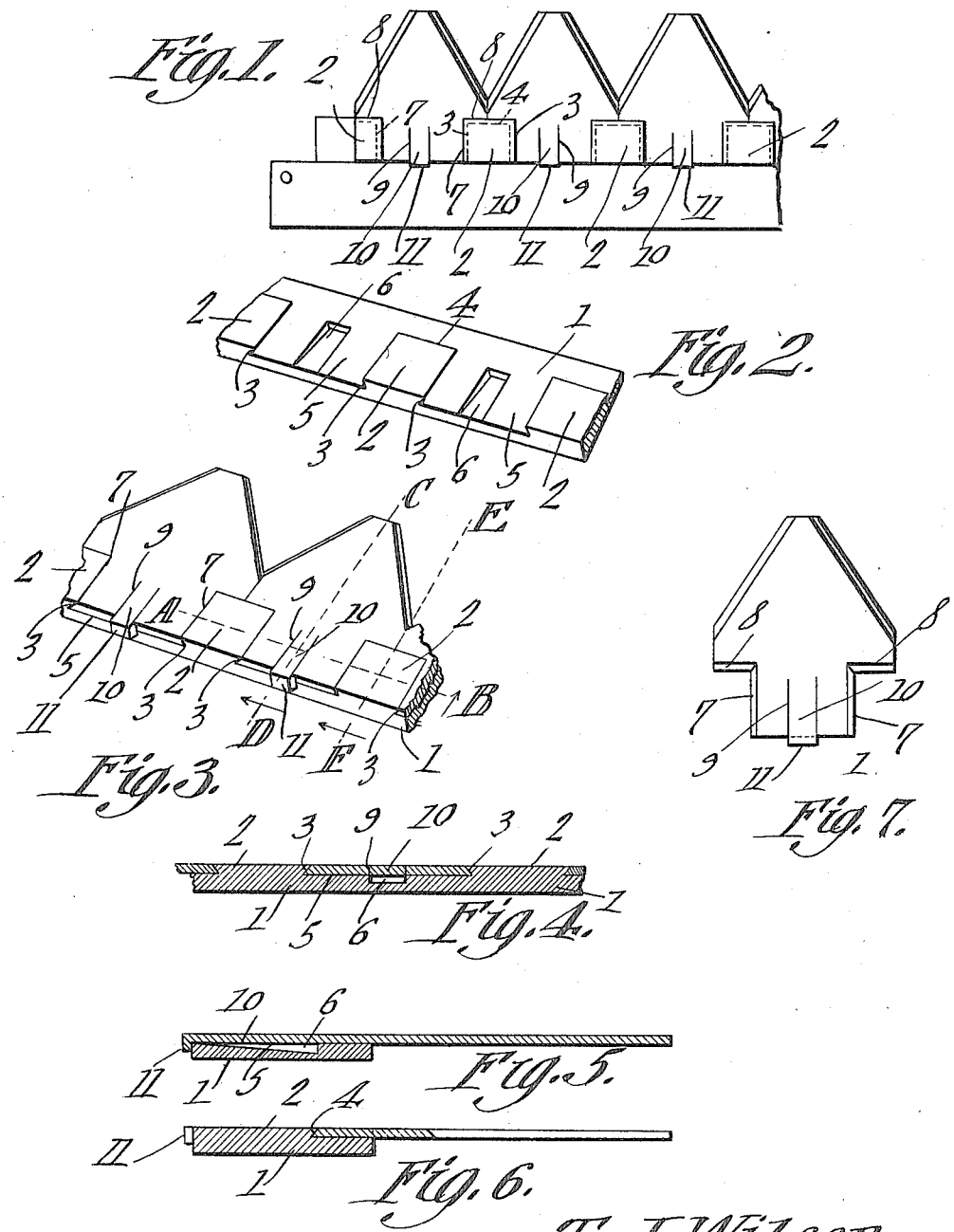
Witnesses
Inventor
T. J. Wilson
by
Attorneys

UNITED STATES PATENT OFFICE.

THOMAS J. WILSON, OF SALINE COUNTY, ARKANSAS.

CUTTER-BAR FOR HARVESTING-MACHINES.

1,164,691.    Specification of Letters Patent.    Patented Dec. 21, 1915.

Application filed April 22, 1915. Serial No. 23,159.

*To all whom it may concern:*

Be it known that I, THOMAS J. WILSON, a citizen of the United States, residing in the county of Saline and State of Arkansas, have invented a new and useful Cutter-Bar for Harvesting-Machines, of which the following is a specification.

This invention relates to cutter bars for harvesting machines and more particularly to means for attaching the teeth to the bar without the use of rivets or other separate fastening means, the teeth, after once being placed in position, being securely held against accidental displacement, the securing means being so constructed, however, as to permit the ready disconnection of any one of the teeth whenever it is desired to repair or replace the same.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a top plan view of a portion of a cutter bar having the present improvements. Fig. 2 is a perspective view of a portion of the bar with the teeth removed. Fig. 3 is a perspective view of a portion of the bar and showing the teeth in position thereon. Fig. 4 is an enlarged section on line A—B Fig. 3. Fig. 5 is an enlarged section on line C—D Fig. 3. Fig. 6 is an enlarged section on line E—F Fig. 3. Fig. 7 is a plan view of a blank tooth.

Referring to the figures by characters of reference 1 designates a portion of a cutter bar on which, at regular intervals, are formed angular projections 2 extending partly across the bar 1, each projection being formed with undercut sides as shown at 3, and with an undercut forward end, as shown at 4. Thus dovetail grooves are formed between the projections 2. In the bottoms of these grooves, which have been indicated generally at 5, are formed central depressions 6, each depression being of the same length as the groove and gradually diminishing in depth toward its rear end where the bottom of the groove or depression 6 merges into the plane of the bottom of groove 5.

Each of the teeth used in connection with the bar 1 is formed in a single blank of sheet steel having its base cut away at the sides, as shown at 7 to form oppositely extending shoulders or abutments 8, these shoulders or abutments being beveled as shown and the sides of the base being likewise beveled. Incisions 9 are cut into the base of the tooth, these incisions being parallel and forming between them a tongue 10 which extends a short distance rearwardly from the base, said tongue being adapted to be bent downwardly, as shown particularly in Figs. 3 and 5, thus to form a retaining lip 11. The width of the base of the tooth is approximately equal to the width of each of the grooves 5.

In placing a tooth in position upon the bar 1 the lip 11 is placed in the deepest portion of the groove 6 and the tooth is pushed rearwardly. This brings the beveled sides of the base of the tooth under the overhanging sides of the projections 2 and also causes the lip 11 to ride along the inclined bottom of groove 6 until it reaches the rear end of the groove, whereupon it will snap into engagement with the rear edge of the bar 1. Simultaneously with this action, the beveled shoulders 8 come against the undercut portions 4 of the projections 2 so that the tooth is thus held firmly upon the bar 1 by the overhanging walls 3 and 4, while the ear 11 prevents the tooth from being withdrawn accidentally from the bar. Whenever it is desired to disengage the tooth, it is merely necessary to pry upwardly on the lip 11 so as to disengage it from the bar 1 whereupon the tooth can be pulled outwardly, lip 11 riding downwardly within the groove 6, until the base of the tooth has been withdrawn from engagement with the projections 2, at which time the lip comes against the end wall of the groove 6, and limits further sliding movement of the tooth. The tooth can then be lifted upwardly off of the bar.

What is claimed is:—

The combination with a bar having spaced projections provided with overhanging sides and forward ends, said projections forming a dovetail groove therebetween extending partly across the bar, there being a longitudinal groove within the bottom of the dovetail groove and increasing in depth forwardly, said longitudinal groove being substantially equal in length to the projections, of a tooth having a base insertible into the dovetail groove and formed with beveled sides, there being laterally extending beveled shoulders at opposite sides of the base, said shoulders being insertible into engagement with the overhanging ends of the projections and the sides of the base being movable into engagement with the walls of the dovetail groove, there being parallel incisions within the base forming a spring tongue therebetween, one end of the tongue being downturned to form a lip for engaging the rear edge of the bar, the forward end wall of the longitudinal groove and the lip on the tongue coöperating to limit the sliding movement of the tooth in one direction relative to the bar.

In testimony that I claim the foregoing as my own, I have hereto affixed my signature in the presence of two witnesses.

THOMAS J. WILSON.

Witnesses:
W. M. STEED,
E. H. BELL.

Copies of this patent may be obtained for five cents each, by addressing the "Commissioner of Patents, Washington, D. C."